US011137514B2

(12) United States Patent
Echeverria Ciaurri et al.

(10) Patent No.: US 11,137,514 B2
(45) Date of Patent: Oct. 5, 2021

(54) METHOD FOR DETERMINING A DRILLING PLAN FOR A PLURALITY OF NEW WELLS IN A RESERVOIR

(71) Applicants: International Business Machines Corporation, Armonk, NY (US); REPSOL, S.A., Madrid (ES)

(72) Inventors: David Echeverria Ciaurri, New York, NY (US); Sonia Mariette Embid Droz, Madrid (ES); Eduardo Goncalves Dias De Barros, Delft (NL); Ruben Rodriguez Torrado, Madrid (ES)

(73) Assignees: International Business Machines Corporation, Armonk, NY (US); REPSOL, S.A., Madrid (ES)

( * ) Notice: Subject to any disclaimer, the term of this patent is extended or adjusted under 35 U.S.C. 154(b) by 471 days.

(21) Appl. No.: 15/871,649

(22) Filed: Jan. 15, 2018

(65) Prior Publication Data
US 2018/0284311 A1    Oct. 4, 2018

(30) Foreign Application Priority Data

Mar. 29, 2017    (ES) ............................... ES201700314

(51) Int. Cl.
*G01V 3/30* (2006.01)
*E21B 43/30* (2006.01)
(Continued)

(52) U.S. Cl.
CPC ............... *G01V 3/30* (2013.01); *E21B 41/00* (2013.01); *E21B 43/30* (2013.01); *E21B 47/09* (2013.01); *E21B 47/13* (2020.05)

(58) Field of Classification Search
CPC .......... G01V 3/30; E21B 41/00; E21B 43/30; E21B 47/09; E21B 47/122
(Continued)

(56) References Cited

U.S. PATENT DOCUMENTS 9,002,766 B2    4/2015  Trainor-Guitton et al.
2014/0365192 A1   12/2014  Cheng et al.

FOREIGN PATENT DOCUMENTS

WO    WO200162603 A2    8/2001
WO    WO2006065915 A2   6/2006
WO    WO-2014197636 A1 * 12/2014 ......... E21B 41/0092

OTHER PUBLICATIONS

Rorrado_2017 (Optimal Sequential Drilling for Hydrocarbon Field Development Planning, Proceedings of the Twenty-Ninth AAAI Conference on Innovative Applications (IAAI-17), Feb. 6-9, 2017 San Francisco, California). (Year: 2017).*

(Continued)

*Primary Examiner* — Brian S Cook
(74) *Attorney, Agent, or Firm* — Joseph Petrokaitis; Otterstedt, Wallace & Kammer, LLP

(57) ABSTRACT

One aspect includes a method for determining a drilling plan for new wells in a reservoir. The method includes categorizing the new wells into at least a first new well and a second new well, such that a drilling location for at least the first new well must be determined imminently, but a drilling location for at least the second new well can be determined at a later time. The method further includes determining potential drilling locations for the second new well, determining the drilling location for the first new well based at least in part on the determined potential drilling locations for the second new well, and outputting the drilling plan comprising the determined drilling location for the first new well and the determined potential drilling locations for the second new well.

16 Claims, 12 Drawing Sheets

(51) Int. Cl.
*E21B 41/00* (2006.01)
*E21B 47/13* (2012.01)
*E21B 47/09* (2012.01)

(58) Field of Classification Search
USPC .......................................................... 703/10
See application file for complete search history.

(56) References Cited

OTHER PUBLICATIONS

Bittencourt_1994 (Optimal Scheduling of Development in an Oil Field, Aug. 1994 Stanford University). (Year: 1994).*
Cunningham_2008 (AAPG Bulletin, V. 92, No. 10 (Oct. 2008), pp. 1393-1402) (Year: 2008).*
Haggquist_2015 (The Economic Value of Geologic Information: Synthesis and Directions for Future Research, Resources Policy 43 (2015) 91-100). (Year: 2015).*
R.A. Howard, "Information Value Theory," IEEE Transactions on Systems Science and Cybernetics, Aug. 1966, v.2, n.1, p. 22-26.
P. Cunningham et al., "Using the value of information to determine optimal well order in a sequential drilling program," AAPG Bulletin, Oct. 2008, v.92, n. 10, p.1393-1402.
E.G.D. Barros et al., "Value of information in closed-loop reservoir management," Computational Geosciences, Jun. 2016, v.20, n. 3, p. 737-749.
B. Guyaguler et al., "Uncertainty Assessment of Well-Placement Optimization," SPE Reservoir Evaluation & Engineering, Feb. 2014, v.7, n.1, p. 24-32.
Counterpart PCT application PCTEP2018/057725, written opinion of the ISA, Authorized Officer Florian Wehland, EPO as ISA, 5 pages, dated Oct. 8, 2018.
Counterpart PCT application PCTEP2018/057725, International Search Repoort, Authorized Officer Florian Wehland, EPO as ISA, 3 pages, dated Oct. 9, 2018.
Counterpart PCT application PCTEP2018/057725, International Prel. Report on Patentability, Authorized Officer Nora Lindner and Authorized Officer Florian Wehland, EPO as ISA, 6 pages, dated Oct. 1, 2019.

* cited by examiner

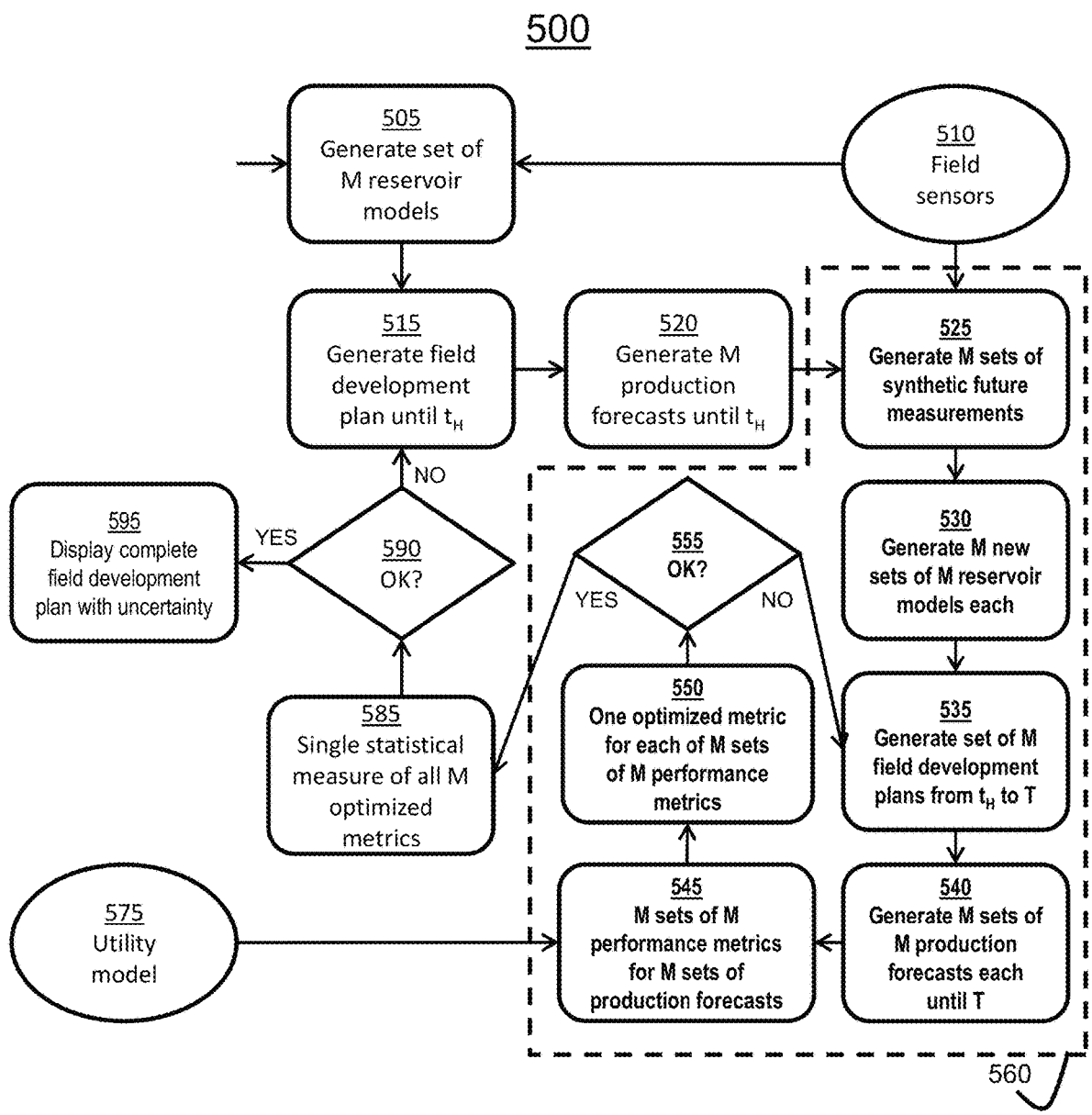

800

1200

US 11,137,514 B2

METHOD FOR DETERMINING A DRILLING PLAN FOR A PLURALITY OF NEW WELLS IN A RESERVOIR

CROSS-REFERENCE TO RELATED APPLICATIONS

This application claims foreign priority to Spanish Patent Application P201700314, filed 29 Mar. 2017, the complete disclosure of which is expressly incorporated herein by reference in its entirety for all purposes.

BACKGROUND

The present invention relates to the electrical, electronic and computer arts, and, more particularly, to a tool for determining drilling locations of future oil wells.

The current practice in oil companies consists of designing a single deterministic field development plan, determining a single location and/or trajectory for each one of the wells to be drilled. This can be achieved in many different ways: by using an expert's judgement and/or optimization algorithms; by considering a single best guess scenario and/or different scenarios to account for uncertainty. In any of these cases, the current practice still has as its goal to determine a single deterministic plan. The argument supporting this practice is that there is only one "ground truth" and, therefore, there is only one plan that can be implemented.

SUMMARY

One aspect includes a method for determining a drilling plan for a plurality of new wells in a reservoir. The method includes categorizing the plurality of new wells into at least a first new well and at a second new well, such that a drilling location for at least the first new well must be determined imminently, but a drilling location for at least the second new well can be determined at a later time. The method further includes determining a plurality of potential drilling locations for the second new well, determining the drilling location for the first new well based at least in part on the determined plurality of potential drilling locations for the second new well, and outputting the drilling plan comprising the determined drilling location for the first new well and the determined plurality of potential drilling locations for the second new well.

Another aspect includes a method for determining a drilling plan for a plurality of new wells in a reservoir. The method includes categorizing the plurality of new wells into at least a first new well and at a second new well, such that a drilling location for at least the first new well must be determined imminently, but a drilling location for at least the second new well can be determined at a later time. The method further includes determining the drilling location for the first new well, determining a plurality of potential drilling locations for the second new well based at least in part on the determined drilling location for the first new well, and outputting the drilling plan comprising the determined drilling location for the first new well and the determined plurality of potential drilling locations for the second new well.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

These and other features and advantages of the present invention will become apparent from the following detailed description of illustrative embodiments thereof, which is to be read in connection with the accompanying drawings.

BRIEF DESCRIPTION OF THE DRAWINGS

FIG. 5 shows a method for calculating a field development plan according to an embodiment of the present invention;

DETAILED DESCRIPTION

As discussed above, conventional techniques involve designing a single deterministic field development plan with a single location/trajectory (though possibly including multilateral completions) for each one of the wells to be drilled. However, for a case with geological uncertainty due to limited knowledge about the subsurface, the optimal location of future wells may change as more wells are drilled and thus more knowledge about the reservoir becomes available. Thus, embodiments of the present invention advantageously allow for development plans to be defined incorporating some degree of flexibility that allows for adaptation based on new information, as opposed to current practices based on a deterministic plan which does not provide flexibility for locations and/or trajectories of new wells despite uncertainty in field parameters.

Although the present application describes primarily a field development application based on oil production by water flooding in which the reservoir contains oil and water, but there is no gas, one skilled in the art will understand that inventive techniques may be utilized in other contexts, such as oil production through other techniques, gas production, etc.

Figure 1:
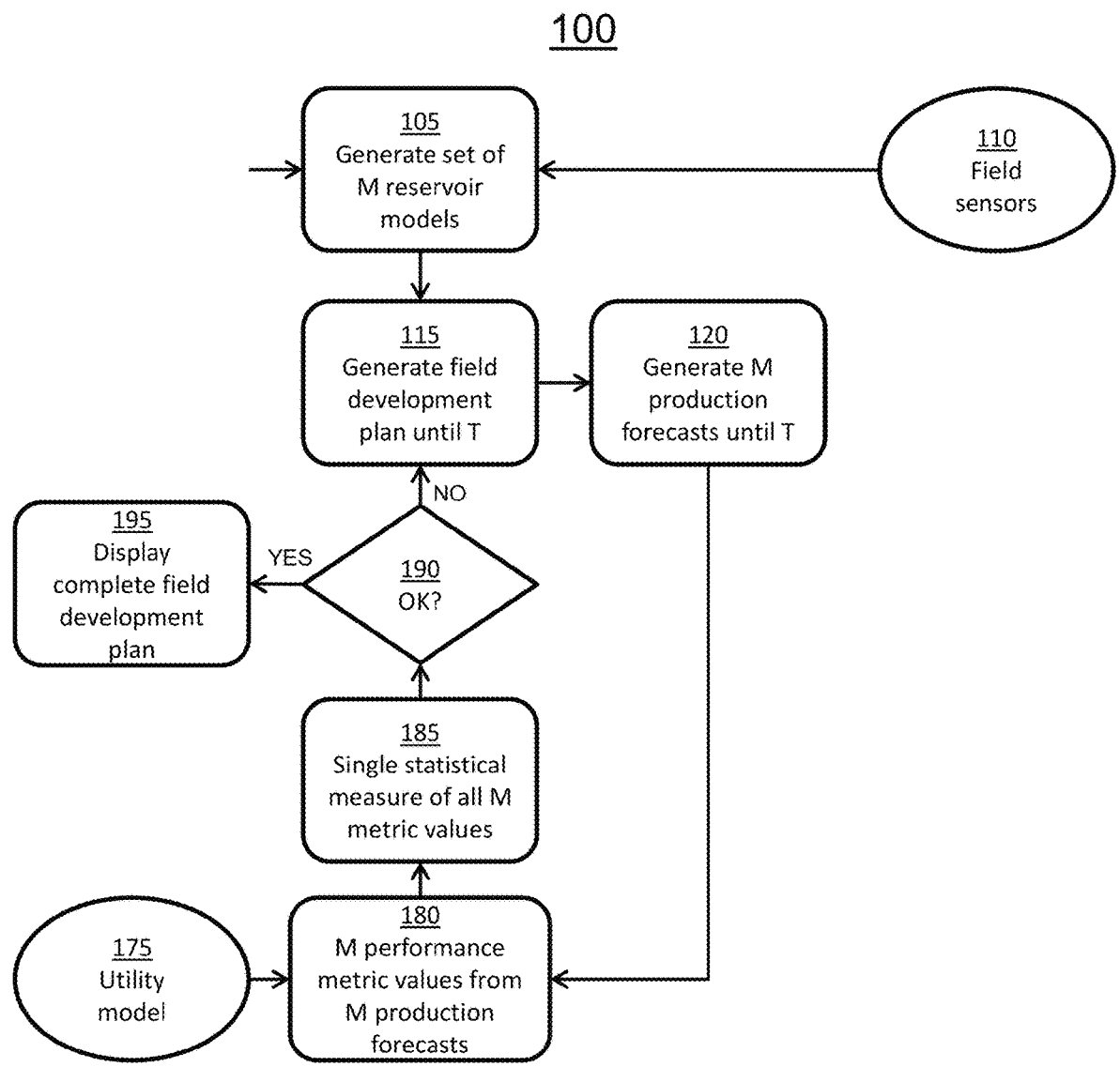
FIG. 1 shows a method for calculating a deterministic field development plan.

FIG. 1 shows a method 100 for calculating a deterministic field development plan. Method 100 begins in step 105, when data is collected from field sensors 110 and used to generate a set of M reservoir models. Data which may be available from field sensors 110 may include, for example, well logs, seismic surveys, and production data from existing wells. Frequently, the geological features of the reservoir are not entirely known. If an engineer is not able to determine with certainty some of the parameters needed to obtain production forecasts, a common approach is to generate an ensemble of M possible configurations (also known as realizations) that characterize the uncertainty around these parameters. A typical example of these parameters is the spatial heterogeneous distribution of flow-relevant rock properties in the reservoir such as porosity and permeability. Thus, the set of M reservoir models represent different distributions of geomaterials, each of which is consistent with the available geological data. It is assumed that each reservoir model produces a satisfactory characterization of the reservoir of interest, whose geological properties are always unknown. Some properties of the reservoir may not have uncertainty associated with them, such as the geometry of the reservoir and the depth of the water-oil contact, if these parameters can be determined with an acceptable degree of certainty using existing measurements such as seismic surveys (e.g., from field sensors 110). These known model properties may be shared by each of the set of M reservoir models. As will be discussed hereinafter, multiple production forecasts are generated based on respective ones of these reservoir models.

Figure 2:
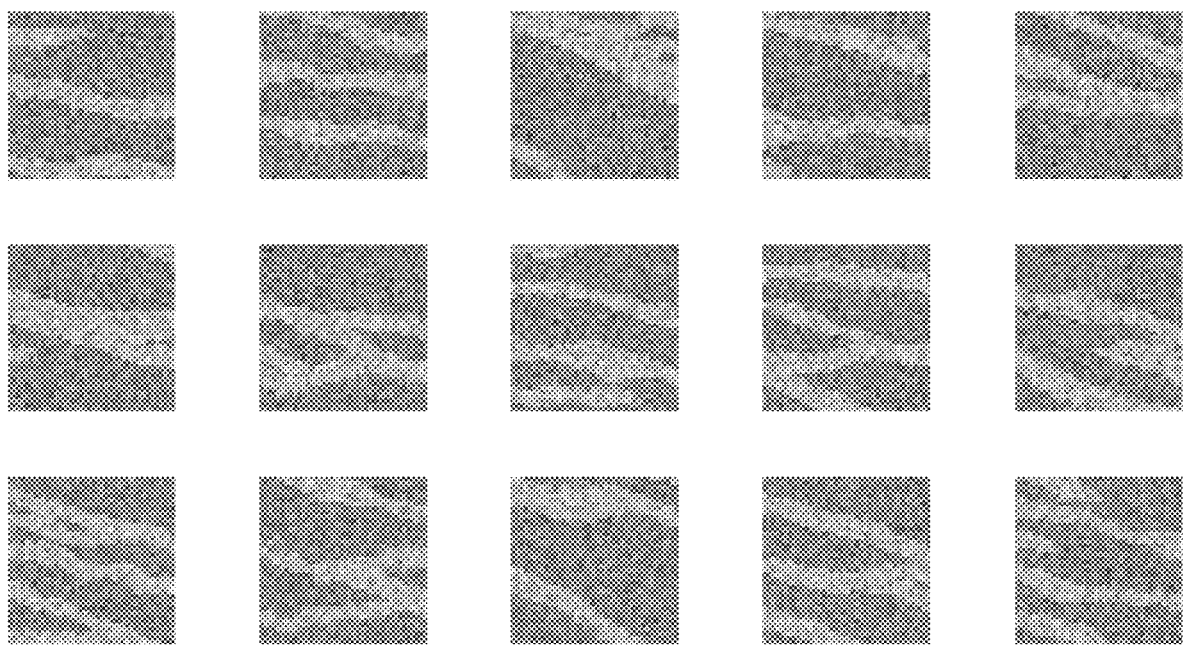
FIG. 2 shows an exemplary set of reservoir models suitable for use with an embodiment of the present invention.

FIG. 2 shows an exemplary set of reservoir models suitable for use with an embodiment of the present invention. In an embodiment, the rocks in the reservoir may be distributed heterogeneously forming sand channels, whose geometry and position are uncertain, on a background of shale. Because flow-relevant properties such as porosity and permeability can vary significantly for different types of rocks, these heterogeneities may have a significant impact on the fluid flow in the reservoir and, in turn, on the production performance of the oil field. In the reservoir models shown in FIG. 2, darker shades correspond to shale rock and lighter shades correspond to sand.

Returning to FIG. 1, in step 115, the set of M reservoir models is used to generate a field development plan until T. T refers to a production timeframe, and is typically on the order of several years (e.g., 1400 or 3000 days). The field development plan refers to a sequence of drilling operations at various locations and times, i.e., how many wells will be drilled, when and where the wells will be drilled, and how the wells will be controlled. For example, a field development plan may call for the immediate drilling of an additional production well (producer), and drilling of an additional injection well (injector) in a few months.

Given a field development plan P for the next T days (or weeks, months, years, etc.), step 120 uses a physics model to make numerical predictions regarding fluid production/injection at existing and future wells. The physics model(s) can be solved numerically by means of an available reservoir flow simulator. The physics model is based on a number of parameters that we can estimate based on measurements from the field/reservoir.

The prediction forecasts obtained from the reservoir simulator typically consist of series of values corresponding to the predicted volumetric (e.g., production/injection) rates associated with the different wells drilled in the reservoir. In general we do not have enough measurements to determine all the parameters in the physics model so the "parameter estimation problem" is underdetermined, i.e., multiple and different selections of model parameters reproduce the measurements with acceptable level of accuracy. Thus, we use a collection of M different configurations of model parameters that are consistent with the currently available information: the reservoir models from step 105. As a result, for the given field development plan P we can generate M numerical production/injection predictions (each of them associated with a respective one of the M parameter configurations) in step 120.

In step 180, the M production forecasts generated in step 120 are used to calculate M performance metric values. The performance metric is the criterion used to compare different field development plans. The performance metric may be chosen by the decision maker reflecting his/her preferences. Typically, the performance of the development plans is measured in terms of cumulative oil production and/or utility values (e.g., resource balance values that may be assessed for instance in economic terms like the net present value or cumulative cash flow). If performance is measured based on cumulative oil production, the performance metric can be determined directly from the production forecast of our reservoir flow simulator.

On the other hand, if performance is measured in utility terms, utility model 175 may be used in order to determine the predicted utility values (e.g., economic values such as net present value or cumulative cash flow) from the production forecasts. Utility model 175 could be a formula to compute the utility values from the series of predicted volumetric rates. Utility model 175 may include various utility (e.g., economic) parameters as discussed below. Utility model 175 may comprise an economic model if the predicted utility values comprise economic values.

In step 180, multiple scenarios (e.g., M different reservoir models) are considered in order to account for uncertainties in a manner similar to that discussed above with reference to step 120. Thus, multiple performance metrics are computed for a given development plan (e.g., for a given plan, M performance metrics: one for each scenario). However, in order for plans to be ranked relative to each other, every plan should have a single number (i.e., a statistical measure) associated with it. An optimization algorithm can then be used to find the plan with the best value for this statistical measure, and thereby to maximize the performance of the oil field by determining the best development plan.

Step 185 involves taking a statistical measure of these M metrics, such as the average or percentile, in order to quantify the potential of the given field development plan P by means of just one number. Because of all the uncertainties involved, this statistical measure is defined as a function of the ensemble of realizations of the uncertain parameters (e.g., average, percentiles, . . . ). This function may also include some potential practical/operating constraints (e.g., minimum allowed inter-well distance and maximum water rate that can be used in production).

Step 190 uses the statistical measure to determine if the field development plan meets a sufficiency criteria. If so, it is output in step 195. If not, the process returns to step 115 for generation of a new field development plan. Method 100 implements robust open-loop optimization. It is assumed that, through high-performance computing and advanced optimization, one can (i) determine a number M of different configurations of model parameters that are consistent with the available information (i.e., solve the "parameter estimation problem"), and (ii) optimize a development plan (e.g., optimizing how many wells will be drilled, when/where the wells will be drilled and how the wells will be controlled) subject to operational and general constraints (e.g., minimum allowed inter-well distance and maximum water rate that can be used at injection) for the existing M configurations of model parameters and obtain a single field development plan that according to some statistics of the performance measure, e.g., the average of the net present value, is optimal for all M parameter configurations.

Figure 3:
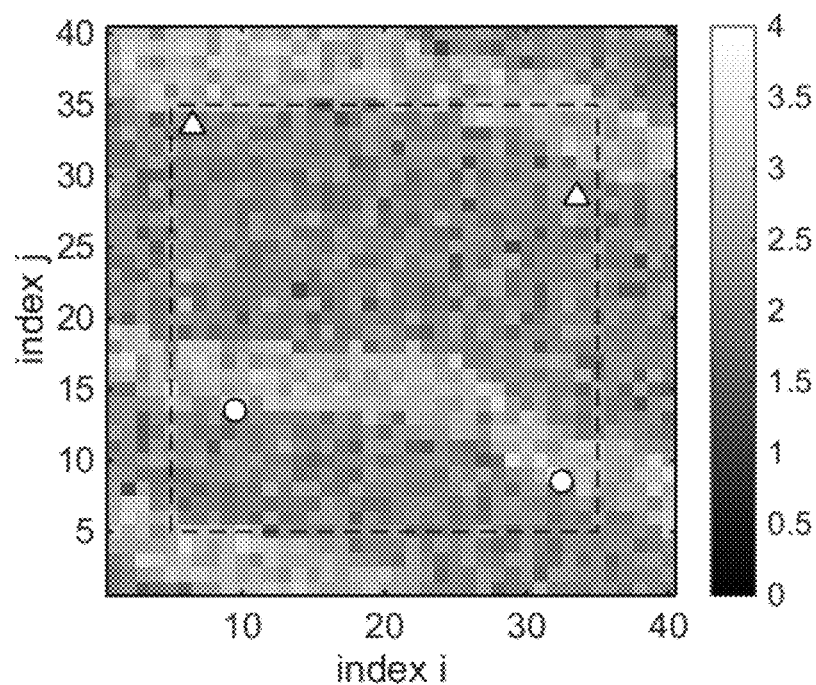
FIG. 3 shows an exemplary deterministic field development plan.

FIG. 3 shows an exemplary output of the method 100 shown in FIG. 1. Specifically, FIG. 3 is a map showing a single deterministic field development plan: a single location for each one of the wells. Producers are represented as circles, and injectors are represented as triangles. The background of the plot displays information related to the spatial distribution of rock properties of the reservoir in a manner similar to that discussed above with reference to FIG. 2: darker shades correspond to shale rock and lighter shades correspond to sand.

In contrast to the aforementioned deterministic techniques, which require decisions about all wells to be made at once, embodiments of the present invention recognize that some wells may need to be decided sooner than others. Thus, the set of wells to be drilled may be divided into two sets, W1 and W2 (note that the number of wells in each set is not known and has to be determined/optimized). W1 refers to those wells which corresponding plan needs to be determined immediately because that is the next action to take place and the resources associated with the drilling of these wells (e.g., drilling rigs) have to be allocated. W2 are the wells which plan does not need to be known now. Note that after we drill the wells W1 our knowledge of the reservoir will be improved and with that a more robust decision can be made regarding the plan for the W2 wells. The plan for the wells W1 is optimized taking into account that new information is assimilated after their drilling and used to iteratively improve estimates for M different configurations of model parameters that describe reservoir flow and in turn to optimize the plan for the remaining wells W2 with these improved M configurations of parameters. Mathematically this is formulated as a nested optimization problem. An embodiment of the invention may therefore be based on the solution of this nested optimization problem or on some efficient approximation of it. The outcome of this optimization is a plan for the wells W1 and M plans for the wells W2. Thus, the plan for W1 is specified univocally and M (in general) different plans for the wells W2 are given. Hence, uncertainty is included in the plans for wells which drilling is not needed immediately.

The M sets of locations of each of the plans for the wells W2 can be displayed in a map using individual markers, contour plots or "heat maps," helping with that the decision maker regarding the development of the field. The locations of the wells W1 can be overlaid in these representations of the W2 solutions. As in FIG. 3, producers are represented as circles, and injectors are represented as triangles. Wells whose locations have already been determined (e.g., wells which have already been drilled) are shown in white. Wells whose locations have not yet been determined (e.g., wells which have not yet been drilled) are shown in black.

Figure 4A:
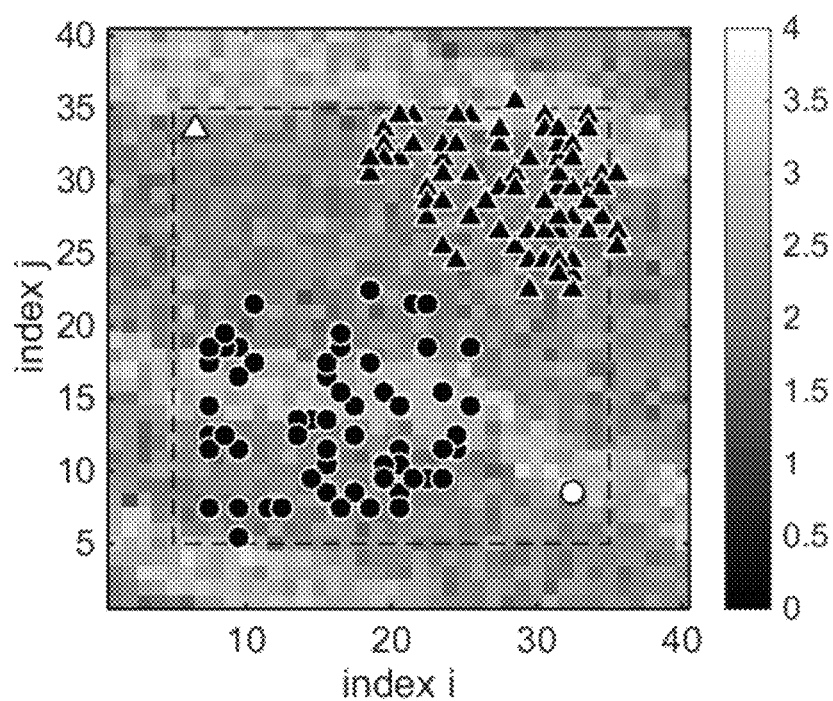
FIG. 4A shows multiple locations for future wells indicated by means of individual markers in accordance with an illustrative embodiment of the present invention.
Figure 4B:
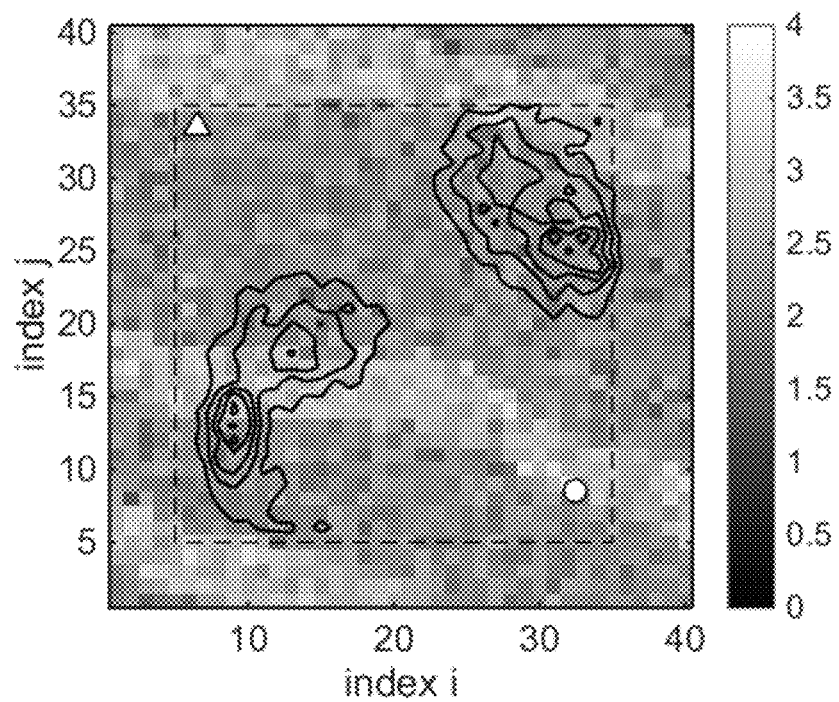
FIG. 4B shows multiple locations for future wells indicated by means of contour plots in accordance with an illustrative embodiment of the present invention.
Figure 4C:
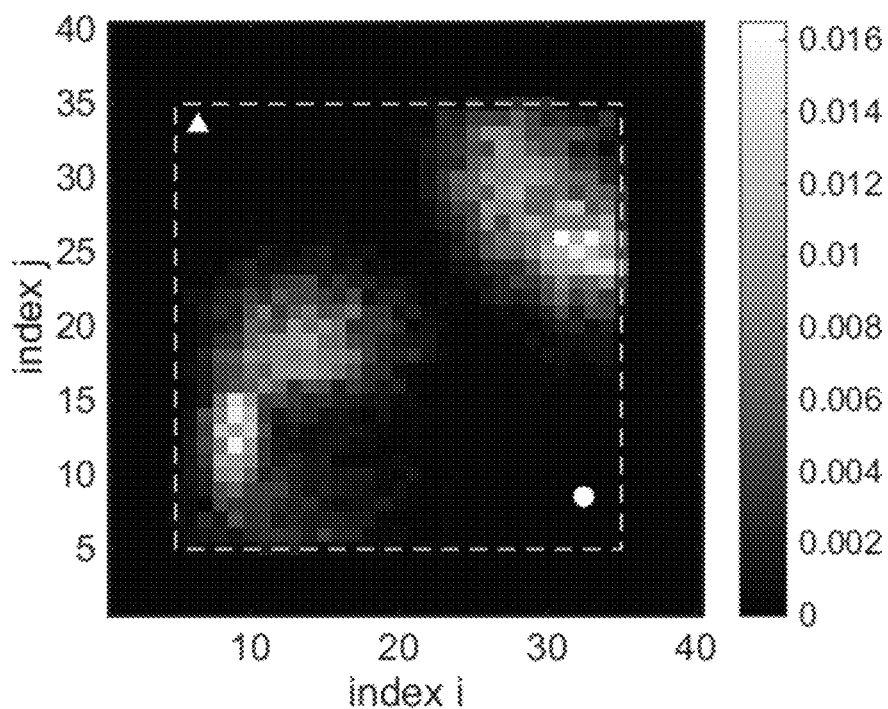
FIG. 4C shows multiple locations for future wells indicated by means of "heat maps" in accordance with an illustrative embodiment of the present invention.

FIG. 4A shows multiple locations for future wells indicated by means of individual markers in accordance with an illustrative embodiment of the present invention. FIG. 4B shows multiple locations for future wells indicated by means of contour plots in accordance with an illustrative embodiment of the present invention. FIG. 4C shows multiple locations for future wells indicated by means of "heat maps" in accordance with an illustrative embodiment of the present invention.

FIG. 5 shows a method 500 for calculating a field development plan according to an embodiment of the present invention. As with method 100 shown in FIG. 1, method 500 begins in 505 with the generation of a set of M reservoir models based on data from field sensors 510. However, unlike method 100 shown in FIG. 1 which is concerned only with the production timeframe T, method 500 shown in FIG. 5 addresses $t_H$, which is a shorter period (e.g., months rather than years) during which decisions must be made immediately. For example, a field development plan may call for the immediate drilling of an additional production well, and drilling of an additional injection well in a few months (e.g., 300 days). Hence, $t_H$ may be 300 days, while T may be 1400 or 3000 days. Note that t=0 refers to the present rather than, for example, a past start date for production in the field.

Thus, step 515 in FIG. 5 only generates a field development plan until $t_H$ (whereas step 115 in FIG. 1 generated the field development plan until T), and step 520 generates M production forecasts until $t_H$ (whereas step 120 in FIG. 1 generated M production forecasts until T). Otherwise, steps 515 and 520 are similar to steps 115 and 120 discussed above with reference to FIG. 1.

Whereas method 100 in FIG. 1 includes a single optimization loop, the steps within the box 560 in FIG. 5 constitute a second, inner optimization loop which is new relative to method 100 in FIG. 1. Within the inner optimization loop, there are M independent searches for a better plan from $t_H$ to T, and therefore there are M plans beings improved for each of the M sets of M models. Meanwhile, in the outer optimization loop, a single plan from 0 to $t_H$ is being improved for all the M sets of M models.

After step 520, method 500 proceeds to step 525, in which M sets of synthetic future measurements are generated using information related to field sensors 510. These synthetic future measurements represent field sensor readings from time 0 (now) until time $t_H$ at each of the wells.

In step 530, M new sets, each containing M reservoir models, are generated based at least in part on the synthetic future measurements. More particularly, for each of the M sets of synthetic future measurements generated in step 525, a new set of M reservoir models is produced. This may involve, for example, solving a parameter estimation problem based on the synthetic future measurements. The new reservoir models need not be generated based solely on the synthetic future measurements, but rather they may be generated so as to be consistent with all available information, including both previously available information (before t=0) and synthetic future measurements (after t=0). In step 535, the M new sets of M reservoir models are used to generate a set of M field development plans from $t_H$ to T. The set of M field development plans from $t_H$ to T generated in step 535 corresponds to the single field development from 0 to $t_H$ generated in step 515.

Step 540 generates a set of M production forecasts for each of the M field development plans P from $t_H$ to T. As discussed above with reference to steps 120 and 520, for a given field development plan P, M numerical production/injection predictions (each of them associated with a respective one of the M parameter configurations) are generated, and each forecast goes until T. Step 540 generates M sets of M production forecasts from $t_H$ to T (corresponding to the M plans from $t_H$ to T generated in step 535), while step 520 generates one set of M production forecasts from 0 to $t_H$ (corresponding to the one plan from 0 to $t_H$ generated in step 515).

In step 545, each of the M production forecasts generated in step 540 are used to calculate M performance metric values. Because M sets of M production forecasts were generated in step 540, M sets of M performance metric values are generated in step 545. In a manner similar to that discussed above with reference to 180 and 175 in FIG. 1, step 545 may involve use of utility model 575 if performance is measured in utility terms. More particularly, if the utility terms in which performance is measured comprise economic terms, utility model 575 may comprise an economic model.

In step 545, M performance metrics are computed for each of the M development plans. However, in order for plans to be ranked relative to each other, each of the M development plans should have a single number (optimized metric) associated with it. Thus, step 550 involves computing an optimized metric, based on the M performance metrics for a given one of the M field development plans (from $t_H$ to T, generated in step 535), which quantifies the potential of that given field development plan by means of a single number. Because of all the uncertainties involved, this optimized measure may be defined as a function (e.g., a statistical measure) of the ensemble of realizations of the uncertain parameters (e.g., average, percentiles, . . . ). This function may also include some potential practical/operating constraints (e.g., minimum allowed inter-well distance and maximum water rate that can be used in production). Notably, step 550 computes M optimized metrics: one optimized metric for each of the M sets of M performance metrics generated in step 545, or in other words, one optimized metric for each of the M field development plans from $t_H$ to T generated in step 535.

Step 555 determines if one or more of the field development plans from $t_H$ to T meets a sufficiency criteria. If not, the process iteratively returns to step 535 to repeat inner optimization loop 560 for an optimization process which progressively generates field development plans using information from previous field development plans until the utility performance metric, and hence the optimized measure, is satisfactory. If yes, the method proceeds to step 585 and returns to the outer optimization loop.

As previously noted, step 550 involves computing M optimized metrics: one optimized metric for each of the M sets of M performance metrics generated in step 545, or in other words, one optimized metric for each of the M field development plans from $t_H$ to T generated in step 535. However, the set of M field development plans from $t_H$ to T generated in step 535 corresponds to the single field development plan until $t_H$ generated in step 515. Thus, step 585 involves taking a statistical measure of these M metrics, such as the average or percentile, in order to obtain one value which quantifies the potential of a given one of the field development plans until $t_H$ generated in step 515. Thus, step 585 involves taking a statistical measure of the M optimized metrics which result from the inner optimization loop 560. This may also include some potential practical/operating constraints (e.g., minimum allowed inter-well distance and maximum water rate that can be used in production).

Step 590 uses the statistical measure from step 585 to determine if the field development plan meets a sufficiency criteria. If not, the process iteratively returns to step 515 and repeats the outer optimization loop for an optimization process which progressively generates field development plans using information from previous field development plans until the utility performance metric, and hence the statistical measure, is satisfactory. If yes, the method outputs the complete field development plan with uncertainty in step 595.

Figure 6:
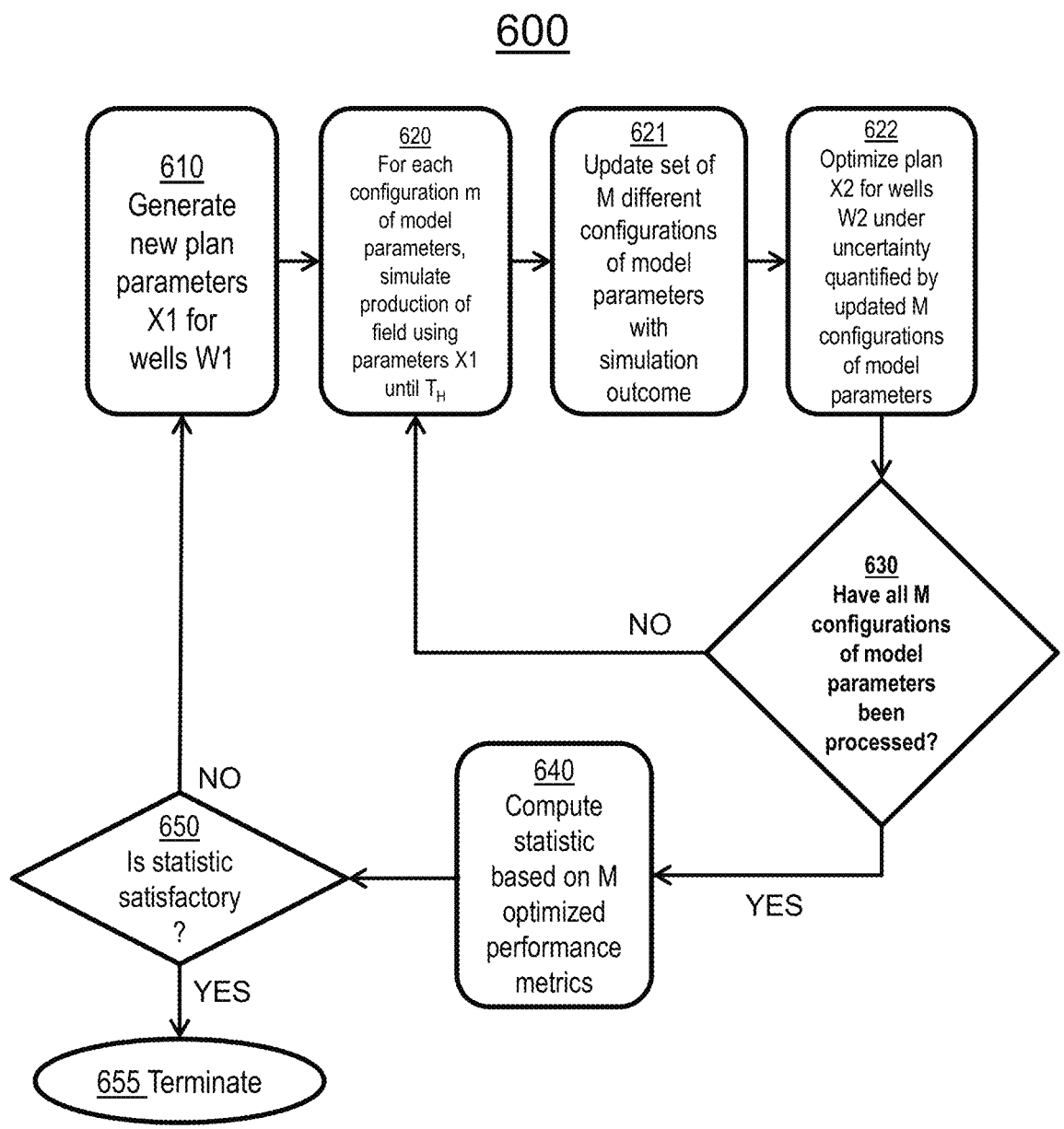
FIG. 6 shows another method for calculating a field development plan according to an embodiment of the present invention.

FIG. 6 shows a method 600 for calculating a field development plan according to an embodiment of the present invention. Method 600 utilizes Informed Field Development Optimization (IFDO). Method 600 may consider an oil field development plan P where the plan for the wells W1 has to be defined now and the plan for the wells W2 will have to be defined in the future. The geological uncertainty associated with the field can be quantified by using M different configurations of model parameters, as discussed above with reference to step 505 in FIG. 5.

In step 610, the field engineer designs the best possible plan P according to a performance metric through the use of optimization accounting for the M different model parameter configurations, assuming that the parameter estimation problem can be solved efficiently (e.g., by means of optimization). X1 is used to denote the parameters that correspond to the plan for the wells W1. Step 610 corresponds to steps 515 and 520 in FIG. 5.

In step 620, one of the M configurations of model parameters is used to simulate production of the field for the plan parameters X1 until time $t_H$ when the first of the wells W2 needs to be drilled. (As discussed below with reference to step 630, step 620 is repeated for each m of the M configurations of model parameters.) Steps 620 and 630 correspond to step 525 in FIG. 5.

In step 621, the M different configurations of model parameters are updated with the simulation outcome by solving a parameter estimation problem based on synthetic future measurements. Note that the simulation outcome may include more information that production data (e.g., well logs and seismic survey data), as discussed above with reference to step 510 in FIG. 5. Step 621 corresponds to step 530 in FIG. 5.

In step 622, the plan for the wells W2 is optimized under uncertainty quantified by means of the updated M configurations of model parameters. The updated plan parameters for wells W2 under a given one (m) of the M configurations of model parameters are denoted by X2(m). Step 622 corresponds to steps 535 to 545 in FIG. 5.

Step 630 checks to see if all M configurations of model parameters have been processed. If not, the method returns to step 620 to process another one (m) of the M configurations of model parameters. Otherwise, the method proceeds to step 640, which computes a statistic based on the M optimized performance metrics determined in step 622. Step 640 corresponds to step 585 in FIG. 5.

Step 650 determines if the statistic is satisfactory. If yes, the method terminates and outputs the field development plan in step 655. If not, the process iteratively returns to step 610 for an optimization process which progressively modifies X1, optionally using information from previous field development plans, until the statistic (e.g., utility performance metric) is satisfactory. Step 650 corresponds to step 590 in FIG. 5.

Figure 7:
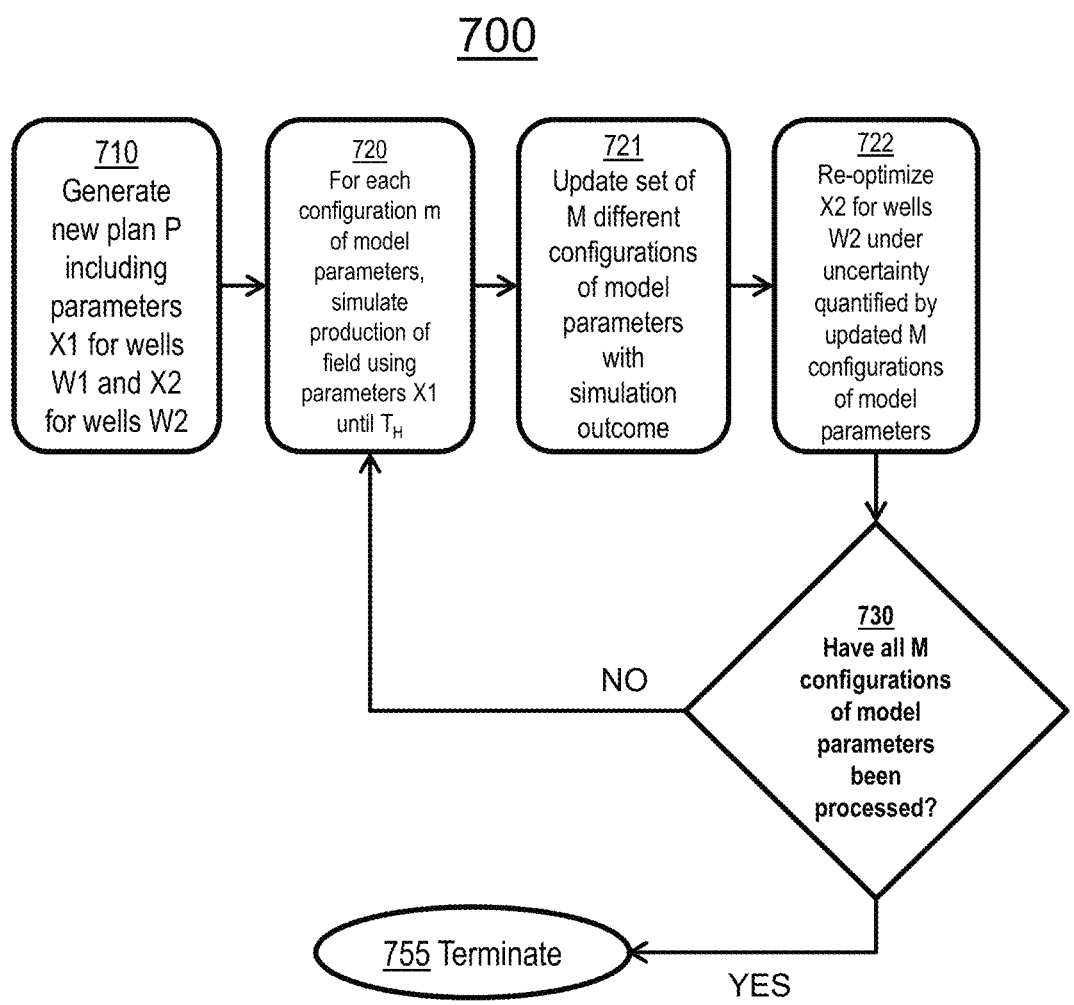
FIG. 7 shows a simplified method for calculating a field development plan according to an embodiment of the present invention.

FIG. 7 shows a simplified method 700 for calculating a field development plan according to an embodiment of the present invention. Method 700 utilizes Closed-Loop Field Development (CLFD). Again, method 700 may consider an oil field development plan P where the plan for the wells W1 has to be defined now and the plan for the wells W2 will have to be defined in the future. The geological uncertainty associated with the field can be quantified by using M different configurations of model parameters, as discussed above with reference to step 505 in FIG. 5.

In step 710, the field engineer designs the best possible plan P according to a performance metric through the use of optimization accounting for the M different model parameter configurations, assuming that the parameter estimation problem can be solved efficiently (e.g., by means of optimization). X1 is used to denote the parameters that correspond to the plan for the wells W1, and X2(m) is used to denote the parameters that correspond to the plan for the wells W2 under a given one (m) of the M configurations of model parameters.

In step 720, one (m) of the M configurations of model parameters is used to simulate production of the field is simulated for the plan parameters X1 until time $t_H$ when the first of the wells W2 needs to be drilled. (As discussed below with reference to step 730, step 720 is repeated for each m of the M configurations of model parameters.)

In step 721, the M different configurations of model parameters are updated with the simulation outcome by solving a parameter estimation problem based on synthetic future measurements. Note that the simulation outcome may include more information that production data (e.g., well logs and seismic survey data), as discussed above with reference to step 510 in FIG. 5. Step 721 corresponds to step 530 in FIG. 5.

In step 722, the plan for the wells W2 is re-optimized under uncertainty quantified by means of the updated M configurations of model parameters. The updated plan parameters for wells W2 under a given one (m) of the M configurations of model parameters are denoted by X2(m).

Step 730 checks to see if all M configurations of model parameters have been processed. If not, the method returns to step 720 to process another one (m) of the M configurations of model parameters. Otherwise, the method terminates and outputs the field development plan in step 755.

Thus, an illustrative embodiment of the present invention may include a tool to determine drilling location of new wells in the development of a hydrocarbon field of interest, said tool comprising visualization capabilities, wherein said locations are obtained through nested optimization of a field development plan wherein: the wells to be drilled in the future can be divided in the wells W1 which plan(s) must be defined now and the wells W2 which plan(s) will have to be defined in the future; the one or more plans associated with wells W2 are optimized in an inner optimization loop once the physics models are improved with the future information gathered at the wells W1 using the simulation output of the wells W1 by solving at least one parameter estimation problem; and the one or more plans associated with wells W1 are optimized in an outer optimization loop once the optimization of the plan for wells W2 has been solved. In an illustrative embodiment, the locations may be obtained through approximate solution of this nested optimization. An example of this approximation comprises first optimizing the plans for wells W1 and W2 without considering future information gathered at wells W1, then improving the physics models with the future information gathered at the wells W1 using the simulation output of the wells W1 by solving at least one parameter estimation problem, and finally optimizing the plan for wells W2 with the improved physics models.

As discussed above, illustrative embodiments of the present invention account for the availability of future information: as the field is developed (e.g., production starts and new wells are drilled) new measurements will be gathered. In practice, this information is usually imperfect: there is some error associated with the measurements. For example, the data acquired by sensors and/or instruments typically is noisy. Moreover, the available measurements are often too limited to precisely describe the entire system throughout. Due to the nature of a petroleum system, the available measurements are often limited to production data and well logs, which are useful to characterize the system only in the vicinity of the wells. The methods described above with reference to FIGS. 5-7 involve the solution of the parameter estimation problem to incorporate the impact of imperfect measurements on the analysis.

An alternative to even further simplify these procedures involves substituting imperfect future measurements (e.g., in steps 620 and 720) with measurements capable of eliminating all uncertainties associated with the reservoir. Since we are concerned with future information, we can consider a situation (denoted "clairvoyance") which assumes that we can somehow obtain perfect future information, e.g., through a major technological breakthrough. After achieving clairvoyance, we would know which one of the previously-considered scenarios is the correct one that corresponds to the true reservoir. This would allow us to reject wrong scenarios and, as a consequence, design development plans better suited to the true reservoir.

It is important to note that clairvoyance may not always be a practical solution because many real-world engineering problems do not have perfect measurements available. Even where clairvoyance is an unrealistic assumption, the resulting output maps can still be used to represent the results and obtain valuable insight from them, while reducing significantly the computational costs associated with the methodology. Clairvoyance can be used to assess what would be the "technical limit" for a given approach (associated with the fact that geological uncertainty is completely eliminated due to future measurements), which can allow us to motivate (and also quantify) the pursuit of such perfect measurement. Also, clairvoyance can be useful to determine "performance bounds" which is usually a desirable property in engineering problems and which can be considered in any decision-making process related to the field development plan under analysis.

Thus, an illustrative embodiment of the present invention may include a tool to determine drilling location of new wells in the development of a hydrocarbon field of interest, said tool comprising visualization capabilities, wherein said locations are obtained through nested optimization of a field development plan wherein: the wells to be drilled in the future can be divided in the wells W1 which plan has to be defined now and the wells W2 which plan will have to be defined in the future; the plan associated with wells W2 is optimized in an inner optimization loop once the physics models are improved with perfect revelation of the physics models or "clairvoyance;" and the plan associated with wells W1 is optimized in an outer optimization loop once the optimization of the plan for wells W2 has been solved. In an illustrative embodiment, the locations may be obtained through approximate solution of this nested optimization. An example of this approximation comprises first optimizing the plans for wells W1 and W2 without considering future information gathered at wells W1, then improving the physics models with perfect revelation of the physics models or "clairvoyance," and finally optimizing the plan for wells W2 with the improved physics models.

Figure 8:
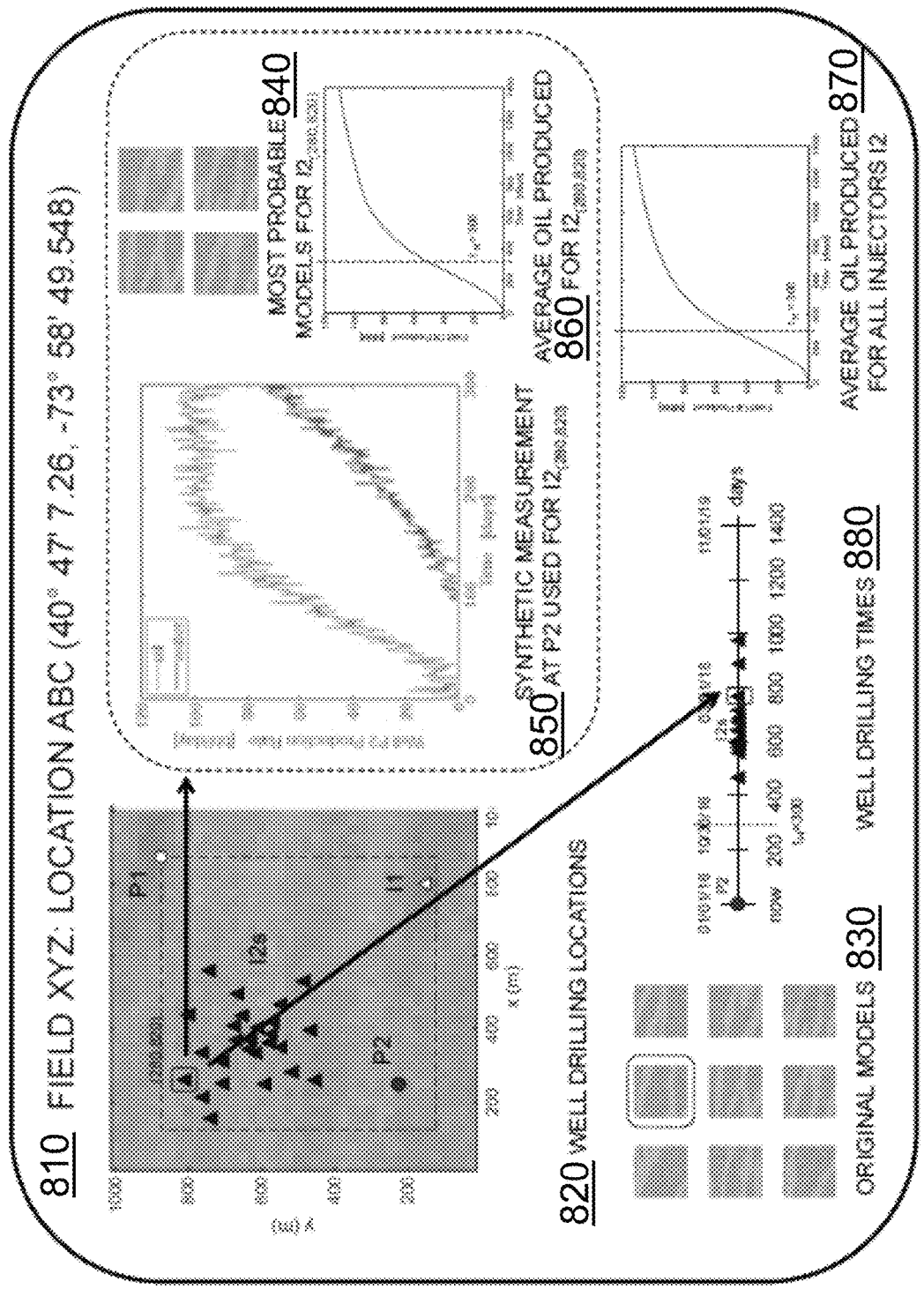
FIG. 8 shows an exemplary graphical user interface output screen which may be associated with an illustrative embodiment of the present invention.

FIG. 8 shows an exemplary graphical user interface output screen 800 which may be associated with an illustrative embodiment of the present invention. Specifically, screen 800 is associated with an embodiment in which there is already a first production well P1 and a first injection well I1, a second production well P2 is being drilled now, and a second injection well I2 will be drilled later. More particularly, in the embodiment associated with screen 800, $t_H$ is 300 days and T is 1400 days.

Display 810 identifies the oil field and gives its location, both by name and by coordinates (i.e., latitude and longitude). Display 820 is a map showing the well drilling locations for P1, I1, and P2, as well as all of the possible locations for I2. One of the possible locations of I2, with coordinates (280, 820), has been highlighted and selected.

Figure 9A:
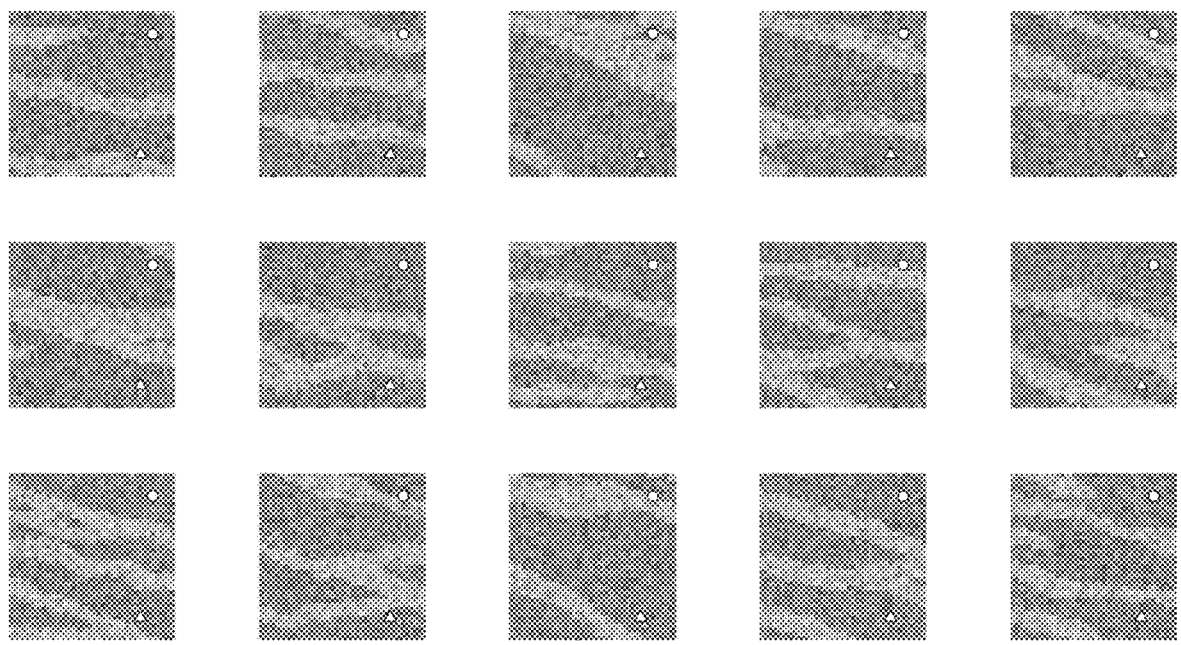
FIG. 9A shows an exemplary set of original models which may be displayed on an exemplary graphical user interface output screen associated with an illustrative embodiment of the present invention.
Figure 9B:
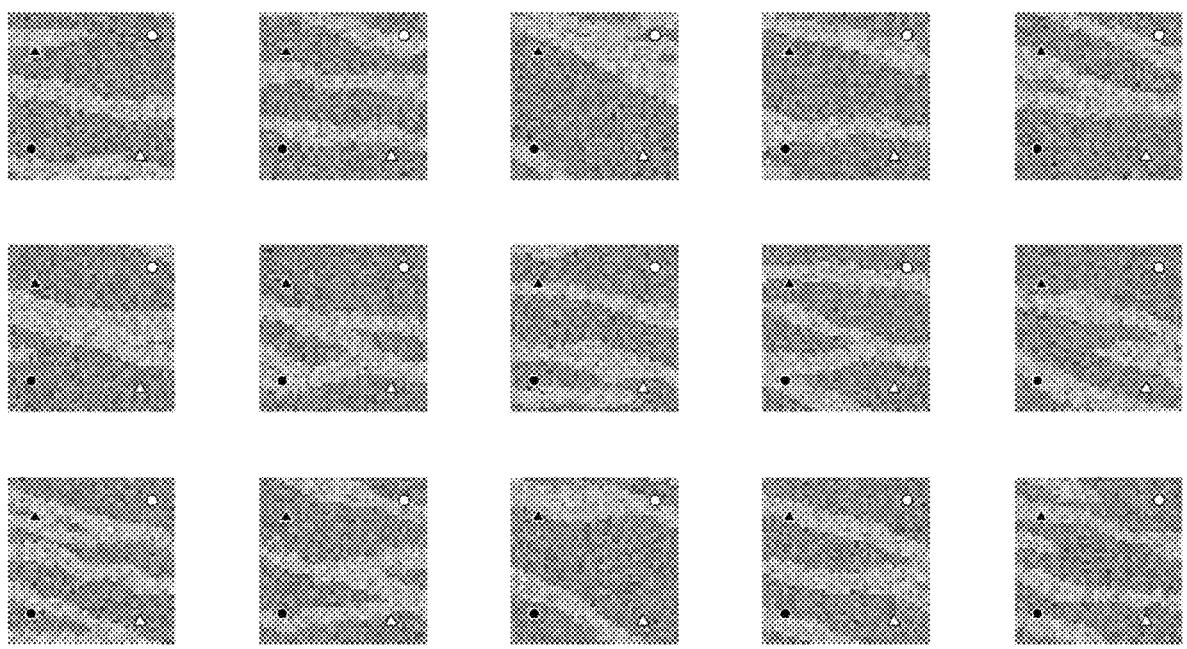
FIG. 9B shows an exemplary set of probable models which may be displayed on an exemplary graphical user interface output screen associated with an illustrative embodiment of the present invention.

Display 830 shows the original models in a manner similar to that shown in FIG. 9A, and may correspond to those shown in FIG. 2. The highlighted model is that which is most likely to be associated with P2. Display 840 shows the most probable models for $I2_{(280,820)}$ in a manner similar to that shown in FIG. 9B.

Display 850 shows the synthetic measurement at P2 used for $I2_{(280,820)}$, as discussed above with reference to step 525 in FIG. 5. Specifically, display 850 shows well P2 production rate for from the present (0 days) to $t_H$ (300 days) for both oil and water. Display 860 shows the average oil produced in the complete field each day from the present (0 days) to T (1400 days) for development plans in which the selected I2 is $I2_{(280,820)}$. Display 870 shows the average oil produced in the complete field each day from the present (0 days) to T (1400 days) for development plans with all possible injectors I2.

Display 880 is a sequential timeline showing the drilling of wells. P2 is drilled on day 0, Jan. 1, 2016. $t_H$ is day 300, Oct. 30, 2016. Note that $t_H$ is merely the day on which the decision needs to be made regarding where to drill I2, not the day on which I2 is drilled. In fact, I2 will typically be drilled some time after $t_H$, with the exact date depending on the optimized location. For example, if the location $I2_{(280,820)}$ is chosen, it will be drilled on Mar. 1, 2018, which is day 790. Display 880 ends at T, day 1400, Nov. 1, 2019.

It may be helpful to discuss an application in which an illustrative embodiment of the present invention may be useful and/or helpful. In general, in an oil company, the reservoir engineer does not decide where to drill the wells, or, at least, she/he does not make this decision alone, but her/his input may be crucial as far as the actual decision is concerned. Thus, a reservoir engineer may need to provide decision support to a decision maker regarding where and when a number (N) of wells (this number may also be determined by the system) have to be drilled from now until time $t_H$ (e.g., a few months); she/he knows that the development of the field will continue after $t_H$ months until time T (e.g., a few years), but she/he doesn't need to provide precise information regarding the field development from $t_H$ until T (e.g., she/he is not required to do so by the respective business units, or whoever is the actual decision maker). However, she/he wants to find where and when to drill until $t_H$ taking into account that more wells will be drilled after $t_H$ so that the current decision includes the complete production of the field until time T. An illustrative embodiment of the invention takes advantage of the fact that in the future we will be able to learn from field production until time $t_H$ (e.g., drilling or production from wells), and we factor that in the overall decision (i.e., all the field development plan from time 0 until time T).

As previously noted, a decision for the location of well W1 must be made imminently since it has to be drilled as soon as possible. The actual decision for the drilling location of well W2 can be made later but it is factored in the decision for W1. The current practice in industry is that, in spite of using multiple reservoir models to characterize the reservoir of interest, drilling locations are specified univocally for each well, regardless if the decision (where to drill the well) has to be made now or in the future. By contrast, an illustrative embodiment of the present invention devises production strategies with well drilling locations that i) are specified univocally for those wells which attendant drilling decision have to be made now, ii) and that are tailored for each possible reservoir model for those wells which attendant drilling decision can be made in the future (when additional information about the reservoir is gathered). In this example, the current practice in industry would be outputting one drilling location for W1 and one drilling location for W2. An illustrative embodiment of the present invention may instead output one drilling location for W1 (it has to be drilled right now) and M generally different drilling locations for W2, each of these M drilling locations associated with each of the M possible reservoir models.

In an illustrative embodiment, a reservoir engineer (or another user) may provide as input the following:

Known model parameters. The reservoir engineer may be able to generate production forecasts using, e.g., a reservoir simulation model, which is characterized by a number parameters. Some of these parameters do not have uncertainty associated with them; and are referred to as known model parameters. Examples of such parameters may include the geometry of the reservoir and the depth of the water-oil contact if the engineer is able to determine these parameters with an acceptable degree of certainty using existing measurements such as seismic surveys.

Uncertain model parameters. If the engineer is not able to determine with certainty some of the parameters needed to obtain production forecasts, a common approach is to generate an ensemble of M possible configurations (commonly known as realizations) that characterize the uncertainty around these parameters. A typical example of these parameters is the spatial heterogeneous distribution of flow-relevant rock properties in the reservoir such as porosity and permeability.

Measurement data. Since an illustrative embodiment of the invention may consider the availability of future observations, the reservoir engineer has to provide information about the measurements planned to be collected, because synthetic measurements need to be generated in order to determine well drilling locations and times after time $t_H$. Typically this information to be provided would be: measurement type (e.g., cores and well logs at drilling locations, production rates and pressures measured at well locations, time-lapse seismic data, . . . ), measurement time/frequency (for the case of production and time-lapse seismic data), measurement precision/reliability (e.g., noise level) and the measurements themselves (i.e., physical connection to measurement devices or to stored measurements). The engineer needs also to indicate how future data is used to update, also in the future, the model uncertain parameters (there are multiple methods to do that; the engineer may use her/his favorite one). Note that the future measurements are also uncertain; they can be associated with each of the realizations of uncertain parameters.

Merit function (performance metric). This is what the engineer uses in the system/tool to rank/compare possible development plans. Examples are net present value associated with field production, cumulative cash flow or cumulative oil production. Because of all the uncertainties involved, this function is defined as a statistical measure for the ensemble of realizations of the uncertain parameters (e.g., average, percentiles, . . . ). This function can also include some potential practical/operating constraints (e.g., minimum allowed inter-well distance and maximum water rate that can be used in production).

Economic parameters are related to the utility model explained above. As previously mentioned, the utility model may be a formula to compute a utility performance metric, such as an economic performance metric (e.g., net present value or cumulative cash flow), from a production forecast (e.g., series of predicted volumetric rates). The formula may use one or more economic parameters which may include, by way of example, one or more of: oil price (in $/barrel, to indicate the revenue obtained with the production of one volumetric unit of oil); water production cost (in $/barrel, to indicate the cost associated with production of one volumetric unit of water—produced water has to be treated before being disposed, which represents a cost); water injection cost (also in $/barrel, to indicate the cost associated with injection of one volumetric unit of water—injecting water into the reservoir requires the use of pumps, which have a cost to be operated); and/or discount factor (in %/year, to indicate the rate for correcting the cash flow along time in order to express it in terms of present value).

Design variables. The selection of variables to be considered in the analysis is a choice of the reservoir engineer. Examples of variables could be well drilling locations and well drilling times (the user may consider each of these groups separately or jointly; this latter case, i.e., determining well drilling locations and times, is represented in display 880).

Design parameters. The system may require to input some other parameters that are known and not subject to design. Examples of these design parameters are characteristics of the wells (e.g., diameter, number of perforations, . . . ), well control settings (prescribed operational pressures/rates, and constraints) and times $t_H$ and T indicated above.

Design method. The user needs to select a particular search/design procedure in the system. Examples of these procedures are local and global optimization methods and experimental design techniques. The user may modify the default settings for the selected procedure or introduce some particular settings of her/his choice. Note that this includes the criteria to decide when to stop the search (i.e., when the utility performance metric is acceptable regarding the decision at hand)

The reservoir engineer (or another user) receives as output the following:

Solution that has to be decided now. The specific information for the decisions at hand that need to be made now, before any additional information/future measurements planned become available. This information for the decisions at hand will be given in a precise (i.e., unique) manner. In display 820 in FIG. 8, a unique well drilling location for the second producer P2 is given because this location has to be determined now.

Solution that can be decided later. For those decisions (relevant to the production of the field) that do not need to be made now and for which more information becomes available later, an illustrative embodiment may advantageously provide solution information including uncertainty/flexibility. In displays 820 and 880 in FIG. 8, for the second injector I2, a collection of potentially good drilling locations and times are provided. Note that each of the possible drilling times and locations are associated with each of the "original models" that quantify model uncertainty. The decision maker may not need to select right now one of these options for I2, but the system provides M scenarios that describe future possibilities (including future measurements) and how the decision maker should act in the future in front of those scenarios. Moreover, we anticipate and include in the analysis all these possible scenarios and measurements in order to make a better choice for the location of P2. The GUI in FIG. 8 can help the reservoir engineer better communicate this field development plan to the actual decision makers.

Relevant simulated data. The volume of data generated can provide very valuable insights to the engineer to further analyze the solution found. This data is shown in FIG. 8 as the collection of future measurements, attendant production profiles and updates of the uncertain "original models" (displays 840-860) or general production profiles for the whole field that correspond to the complete solution found by the system (display 870).

The inventors actually reduced an embodiment of the present invention to practice, and found that it produced unexpected results when compared to the closest prior art. Specifically, we designed an example of a field development application based on oil production by water flooding. The reservoir in this example is 1,000 m×1,000 m×10 m, and it contains oil and water (i.e., there is no gas). We assume that two wells are already drilled in the reservoir, one producer P1 and one injector I1. We plan to drill two additional wells: another producer P2 and another injector I2. We want to find the best drilling locations for these two wells. The producer P2 has to be drilled as soon as possible (in the next days) and the injector I2 will be drilled in 300 days. The production time frame associated with these four wells is 3,000 days starting from now. The wells are operated using constant bottom-hole pressure and the producers are shut in once they are not profitable (i.e., when the revenue that corresponds to oil produced is equal to the production costs, e.g., fluid lifting, water separation, etc.).

The rocks in the reservoir are distributed heterogeneously forming sand channels, whose geometry and position are uncertain, on a background of shale. These heterogeneities have a significant impact on the fluid flow in the reservoir, and, in turn, on the production performance of the oil field. In this example we have M=30 possible reservoir models. FIG. 2 shows 15 out of the 30 reservoir models considered. As previously noted, darker shades correspond to shale rock and lighter shades correspond to sand.

In order to compare different production strategies we use the following performance metric that is frequently considered in industry to evaluate production strategies under uncertainty. For a given production strategy, we determine 30 different production forecasts, each of them associated with each of the 30 reservoir models. The performance metric is a statistic measure computed for the 30 production forecasts. Examples of statistic measures are the average of the total oil produced over the 30 forecasts and, as is the case in this work, the average of the 25% worse (3,000-day) forecasts of net present value (NPV) cash flow of the 30 forecasts. This last measure is also known as conditional value at risk at the 25% level, CVaR(25).

This performance metric is attractive in practical scenarios since it can be interpreted as an estimation of what could happen in the future for the current reservoir of interest (which is unknown). If we consider 30 different hypothetical scenarios in which the true reservoir is one of the 30 reservoir models, then the aforementioned statistics quantify how good a given system to generate production strategies can be.

FIGS. 10A-10D demonstrate the results from applying different techniques to determine drilling locations that maximize CVaR(25) of NPV cash flow over a 3,000 day production timeframe. Each of FIGS. 10A-10D has a background which represents the average of the 30 reservoir models considered. Producers are represented as circles, and injectors are represented as triangles. Wells whose locations have already been determined (e.g., wells which have already been drilled) are shown in white. Wells whose locations have not yet been determined (e.g., wells which have not yet been drilled) are shown in black. As previously noted, we assume that two wells are already drilled in the reservoir, one producer P1 and one injector I1. Thus, P1 is shown as a white circle, and I1 is shown as a white triangle. We plan to drill two additional wells: another producer P2 and another injector I2. Hence, P2 is shown as a black circle, and I2 is shown as a black triangle. Multiple black triangles represent multiple potential drilling locations for I2, and multiple black circles represent multiple potential drilling locations for P2.

Figure 10A:
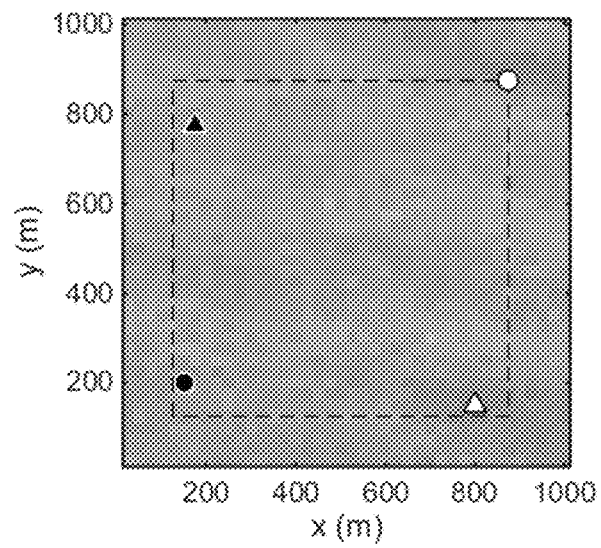
FIG. 10A shows experimental results obtained with the closest prior art using robust open-loop optimization.

FIG. 10A shows experimental results obtained with the closest prior art using robust open-loop optimization. FIG. 10A reflects application of techniques similar to those discussed above with reference to FIG. 1. We applied state-of-the art technology to determine drilling locations for P2 and I2 that maximize CVaR(25) of cash flow associated with the exploitation of the field for the following 3,000 days. We reiterate that the drilling location for P2 has to be decided now and that the drilling location for I2 can be decided later (I2 will be drilled in 300 days), and that P1 and I1 have already been drilled. The resulting strategy is shown in FIG. 10A and yields a CVaR(25) of net present value (NPV) of between $119.4 and 120.1 million and an average NPV over the 30 reservoir models of $128.9 million.

We then utilized illustrative embodiments of the present invention to determine drilling location(s) of P2 and 30 potential drilling locations for I2 that maximize the same metric taken above for the state-of-the art system (i.e., CVaR(25) of NPV associated with the exploitation of the field for the next 3,000 days). The resulting strategy in some embodiments includes one drilling location for P2, which has to be decided now, and 30 possible locations for I2, which drilling location can be decided later.

Figure 10B:
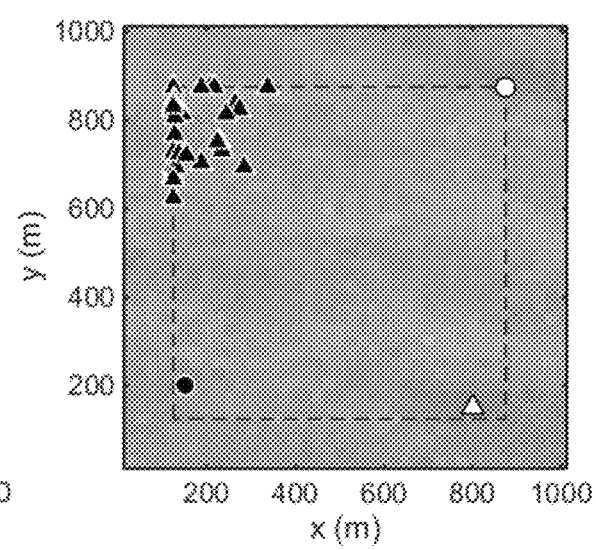
FIG. 10B shows experimental results obtained with an embodiment of the present invention using Closed-Loop Field Development (CLFD)

FIG. 10B shows experimental results obtained with an embodiment of the present invention using Closed-Loop Field Development (CLFD). FIG. 10B reflects application of techniques similar to those discussed above with reference to FIG. 7. FIG. 10B shows one location for P2 and 30 possible locations for I2. Although the location for P2 is similar in FIG. 10B as in FIG. 10A, some locations for I2 in FIG. 10B are more than 200 m away from the location for I2 determined by the state-of-the-art system and shown in FIG. 10A. The production strategy shown in FIG. 10B yields a CVaR(25) of NPV of $128.2 million, which represents an increase of 6.7% over the closest prior art shown in FIG. 10A. The production strategy shown in FIG. 10B also has an average NPV over the 30 reservoir models of $135.1 million, which represents an increase of 4.9% over the closest prior art shown in FIG. 10A.

Figure 10C:
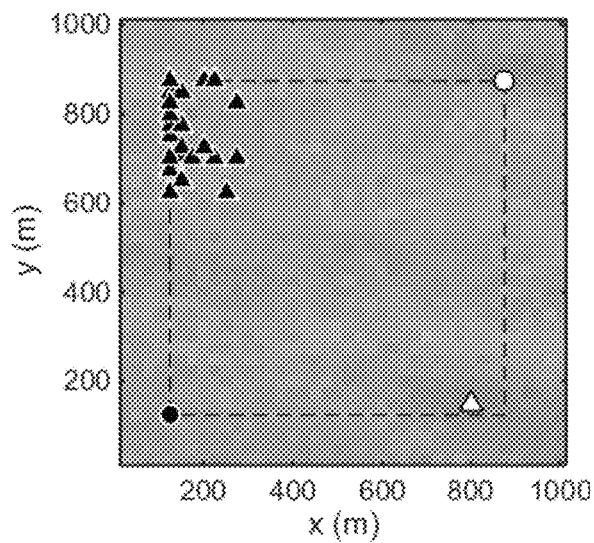
FIG. 10C shows experimental results obtained with an embodiment of the present invention using Informed Field Development Optimization (IFDO)

FIG. 10C shows experimental results obtained with an embodiment of the present invention using Informed Field Development Optimization (IFDO). FIG. 10C reflects application of techniques similar to those discussed above with reference to FIG. 6. FIG. 10C shows one location for P2 and 30 possible locations for I2. Once again, some locations for I2 in FIG. 10C are more than 200 m away from the location for I2 determined by the state-of-the-art system and shown in FIG. 10A. Moreover, the location for P2 is about 80 m south of the location obtained with the state-of-the-art technology and shown in FIG. 10A. The production strategy shown in FIG. 10C yields a CVaR(25) of NPV of $128.5 million, which represents an increase of 7.4% over the closest prior art shown in FIG. 10A. The production strategy shown in FIG. 10C also has an average NPV over the 30 reservoir models of $137.1 million, which represents an increase of 6.4% over the closest prior art shown in FIG. 10A.

Figure 10D:
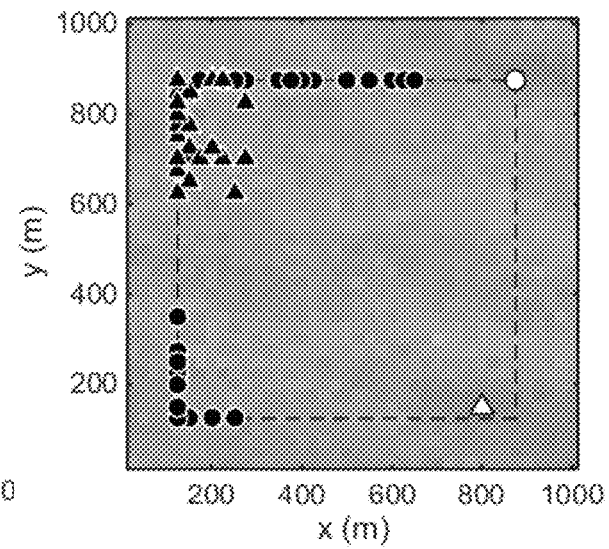
FIG. 10D shows experimental results obtained with an embodiment of the present invention using initial clairvoyance.

FIG. 10D shows experimental results obtained with an embodiment of the present invention using initial clairvoyance. FIG. 10D shows 30 possible locations for I2 which are similar to the 30 possible locations for I2 shown in FIG. 10C. However, while FIGS. 10A-10C each show a single location for P2 located near the lower-left corner, FIG. 10D also shows 30 possible locations for P2 widely dispersed throughout the field: FIG. 10D includes possible locations for P2 not only near the lower-left corner of the field but also near the upper boundary of the field. The production strategy shown in FIG. 10D yields a CVaR(25) of NPV of $130.7 million, which represents an increase of 8.8% over the closest prior art shown in FIG. 10A. The production strategy shown in FIG. 10D also has an average NPV over the 30 reservoir models of $137.8 million, which represents an increase of 7% over the closest prior art shown in FIG. 10A.

Figure 11:
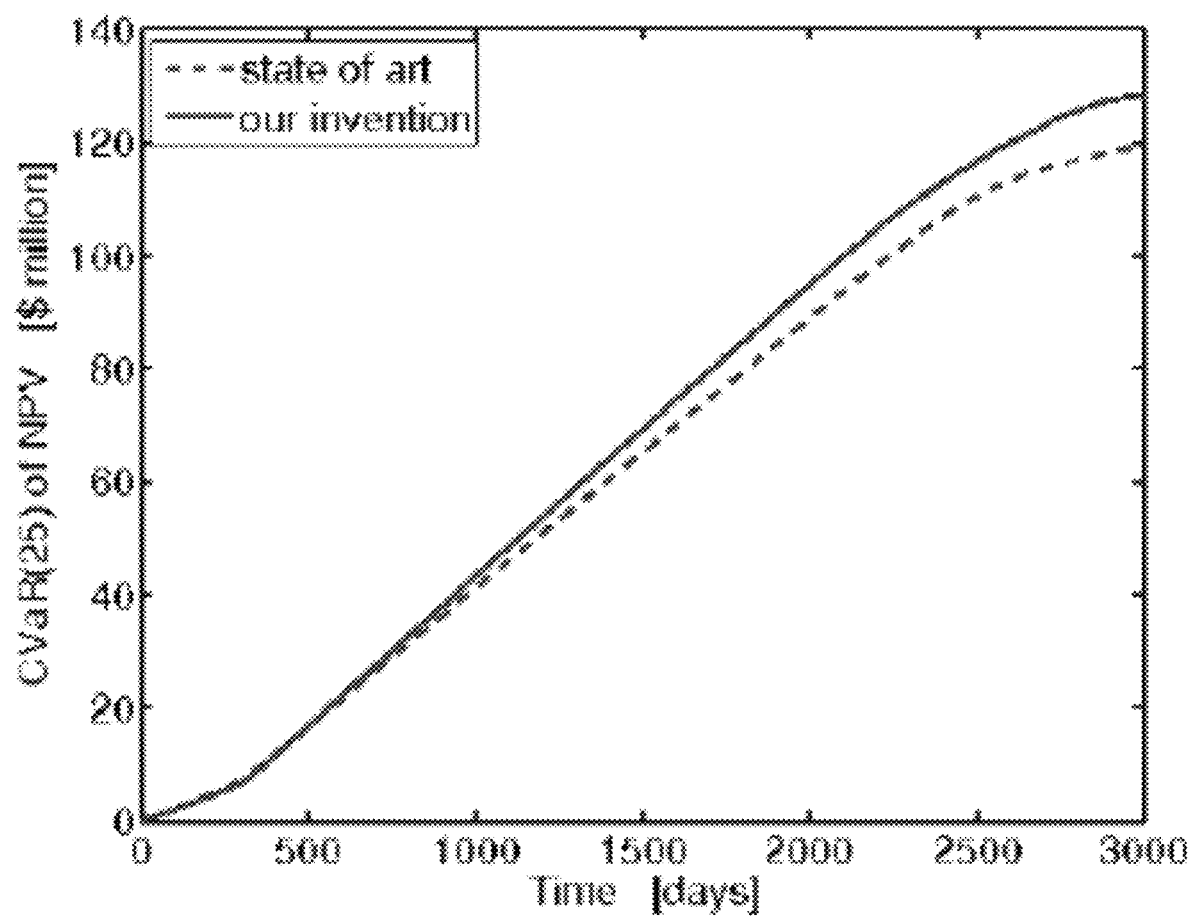
FIG. 11 shows a comparison of the experimental results shown in FIGS. 10A and 10C.

Finally, in FIG. 11 we compare the CVaR(25) of NPV as a function of time for the production strategies shown in FIGS. 10A and 10C, i.e., one determined with the state-of-the-art technology and one obtained with an embodiment of the present invention. An embodiment of the present invention produced an increase in the performance metric of $8.8 million or 7.4% relative to the closest prior art; the corresponding values for average NPV are $8.2 million and 6.4%. We can expect similar relative increases for more complex reservoirs, which, in turn, will be translated in much higher absolute monetary terms.

Recapitulation

Embodiments of the present invention include methods for determining a drilling plan for a plurality of new wells in a reservoir. Each method includes categorizing the plurality of new wells into at least a first new well and at a second new well, such that a drilling location for at least the first new well must be determined imminently, but a drilling location for at least the second new well can be determined at a later time.

In an illustrative embodiment described with reference to FIG. 5, "the set of wells to be drilled may be divided into two sets, W1 and W2 (note that the number of wells in each set is not known and has to be determined/optimized). W1 refers to those wells which corresponding plan needs to be determined immediately because that is the next action to take place and the resources associated with the drilling of these wells (e.g., drilling rigs) have to be allocated. W2 are the wells which plan does not need to be known now."

In an illustrative embodiment described above with reference to FIG. 7, "the wells to be drilled in the future can be divided in the wells W1 which plan(s) must be defined now and the wells W2 which plan(s) will have to defined in the future." Likewise, in an embodiment described with reference to FIG. 8, "a second production well P2 is being drilled now, and a second injection well I2 will be drilled later."

One method, known as a "backward scheme," includes determining a plurality of potential drilling locations for the second new well, and determining the drilling location for the first new well based at least in part on the determined plurality of potential drilling locations for the second new well. In an illustrative embodiment described with reference to FIG. 7, the one or more plans associated with wells W2 are optimized in an inner optimization loop, and the one or more plans associated with wells W1 are optimized in an outer optimization loop once the optimization of the plan for wells W2 has been solved. See also paragraph with reference to FIG. 8: "In displays 820 and 880 in FIG. 8, for the second injector I2, a collection of potentially good drilling locations and times are provided . . . . The decision maker may not need to select right now one of these options for I2, but the system provides M scenarios that describe future possibilities (including future measurements) and how the decision maker should act in the future in front of those scenarios. Moreover, we anticipate and include in the analysis all these possible scenarios and measurements in order to make a better choice for the location of P2."

Another method, known as a "forward scheme," includes determining the drilling location for the first new well, and determining a plurality of potential drilling locations for the second new well based at least in part on the determined drilling location for the first new well. In an illustrative embodiment described with reference to FIG. 5, "after we drill the wells W1 our knowledge of the reservoir will be improved and with that a more robust decision can be made regarding the plan for the W2 wells. The plan for the wells W1 is optimized taking into account that new information is assimilated after their drilling and used to iteratively improve estimates for M different configurations of model parameters that describe reservoir flow and in turn to optimize the plan for the remaining wells W2 with these improved M configurations of parameters." See also with reference to FIG. 6: "In step 610 . . . . X1 is used to denote the parameters that correspond to the plan for the wells W1 . . . In step 622, the plan for the wells W2 is optimized under uncertainty quantified by means of the updated M configurations of model parameters. The updated plan parameters for wells W2 under a given one (m) of the M configurations of model parameters are denoted by X2($m$)."

Each of these methods (e.g., both the "backward scheme" and the "forward scheme") includes outputting the drilling plan comprising the determined drilling location for the first new well and the determined plurality of potential drilling locations for the second new well. These provides beneficial technical effects relative to conventional techniques in which the drilling plan includes a single determined drilling location for each new well, such as the conventional techniques discussed above. See, e.g., ("[E]mbodiments of the present invention advantageously allow for development plans to be defined incorporating some degree of flexibility that allows for adaptation based on new information, as opposed to current practices based on a deterministic plan which does not provide flexibility for locations and/or trajectories of new wells despite uncertainty in field parameters.") and [0040] ("The outcome of this optimization is a plan for the wells W1 and M plans for the wells W2. Thus, the plan for W1 is specified univocally and M (in general) different plans for the wells W2 are given. Hence, uncertainty is included in the plans for wells which drilling is not needed immediately.")

One or more embodiments of the invention, or elements thereof, can be implemented, at least in part, in the form of an apparatus including a memory and at least one processor that is coupled to the memory and operative to perform exemplary method steps.

Figure 12:
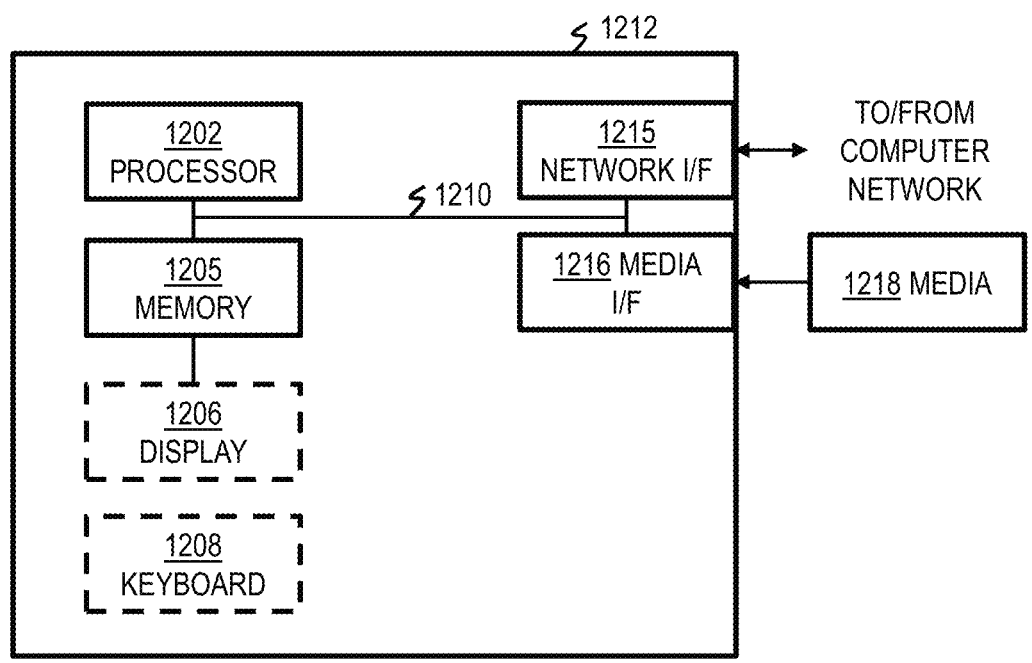
FIG. 12 depicts a computer system that may be useful in implementing one or more aspects and/or elements of the invention.

One or more embodiments can make use of software running on a general purpose computer or workstation. With reference to FIG. 12, such an implementation might employ, for example, a processor 1202, a memory 1205, and an input/output interface formed, for example, by a display 1206 and a keyboard 1208. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 1202, memory 1205, and input/output interface such as display 1206 and keyboard 1208 can be interconnected, for example, via bus 1210 as part of a data processing unit 1212. Suitable interconnections, for example via bus 1210, can also be provided to a network interface 1215, such as a network card, which can be provided to interface with a computer network, and to a media interface 1216, such as a diskette or CD-ROM drive, which can be provided to interface with media 1218.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 1202 coupled directly or indirectly to memory elements 1204 through a system bus 1210. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 1208, displays 1206, pointing devices, and the like) can be coupled to the system either directly (such as via bus 1210) or through intervening I/O controllers (omitted for clarity).

Network adapters such as network interface 1215 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 1212 as shown in FIG. 12) running a server program. It will be understood that such a physical server may or may not include a display and keyboard.

It should be noted that any of the methods described herein can include an additional step of providing a system comprising distinct software modules embodied on a computer readable storage medium; the modules can include, for example, any or all of the elements depicted in the block diagrams or other figures and/or described herein. The method steps can then be carried out using the distinct software modules and/or sub-modules of the system, as described above, executing on one or more hardware processors 1202. Further, a computer program product can include a computer-readable storage medium with code adapted to be implemented to carry out one or more method steps described herein, including the provision of the system with the distinct software modules.

Exemplary System and Article of Manufacture Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for determining a drilling plan for a plurality of new wells in a reservoir, the method comprising:
    categorizing the plurality of new wells into at least a first new well and a second new well, such that a first drilling location for the first new well must be determined before determining a second drilling location for the second new well at a later time;
    determining a plurality of potential drilling locations for the second new well, wherein each of the plurality of potential drilling locations is determined according to a different configuration of model parameters of a geological model of the reservoir;
    determining the first drilling location for the first new well based at least in part on a single statistical measure determined for the plurality of potential drilling locations determined for the second new well; and
    outputting the drilling plan comprising the first drilling location determined for the first new well and the plurality of potential drilling locations determined for the second new well.

2. The method of claim 1, further comprising:
    generating synthetic future measurements representative of at least a period between drilling of the first new well and the later time; and
    determining the second drilling location for the second well based at least in part on the synthetic future measurements.

3. The method of claim 2, wherein the synthetic future measurements comprise:
    measurements representing data from at least one existing well in the reservoir; and
    measurements representing data from the first new well.

4. The method of claim 1, wherein determining the plurality of drilling locations for the second well based at least in part on the generated synthetic future measurements comprises updating the different configurations of model parameters of the geological model of the reservoir by solving a parameter estimation problem.

5. The method of claim 1, wherein the step of determining the plurality of potential drilling locations for the second new well comprises:
    determining a preliminary drilling location for the first new well; and
    determining the plurality of potential drilling locations for the second new well based at least in part on the preliminary drilling location for the first new well.

6. The method of claim 1, wherein:
    determining the drilling plan for the plurality of new wells comprises a nested optimization;
    determining the plurality of potential drilling locations for the second new well comprises an inner optimization loop of the nested optimization; and
    determining the first drilling location for the first new well comprises an outer optimization loop of the nested optimization.

7. The method of claim 1, wherein the plurality of potential drilling locations for the second new well are associated with respective potential dates for drilling.

8. A method for determining a drilling plan for a plurality of new wells in a reservoir, the method comprising:
    categorizing the plurality of new wells into at least a first new well and a second new well, such that a first drilling location for the first new well must be determined before determining a second drilling location for the second new well at a later time;

estimating the first drilling location for the first new well in response to presently available field sensor readings;

generating a plurality of synthesized future field sensor readings;

developing a plurality of different configurations of model parameters of geological models of the reservoir, based on the plurality of future field sensor readings;

determining a plurality of potential drilling locations for the second new well, wherein each of the plurality of potential drilling locations is determined from the first drilling location for the first new well according to one of the plurality of different configurations of model parameters of geological models of the reservoir;

developing a plurality of performance metrics, wherein each of the plurality of performance metrics corresponds to one of the plurality of potential drilling locations, based on the plurality of future field sensor readings;

calculating a single statistical measure based on the plurality of performance metrics;

revising the first drilling location in response to the single statistical measure;

establishing a further plurality of potential drilling locations for the second new well, wherein each of the further plurality of potential drilling locations is determined from the revised first drilling location according to a second different configuration of model parameters of the geological model of the reservoir responsive to the synthesized future field sensor readings; and outputting the drilling plan comprising the revised first drilling location determined for the first new well and the further plurality of potential drilling locations determined for the second new well.

9. The method of claim 8, wherein the different configurations of model parameters are used at least in part to determine the drilling location for the first new well.

10. The method of claim 8, wherein establishing the further plurality of potential drilling locations comprises solving a parameter estimation problem based on the synthesized future measurements.

11. The method of claim 8, wherein the synthesized future measurements comprise:
measurements representing data from at least one existing well in the reservoir; and
measurements representing data from the first drilling location determined for the first new well.

12. The method of claim 8, wherein the plurality of potential drilling locations for the second new well are associated with respective potential dates for drilling.

13. The method of claim 8, wherein:
determining the first drilling location for the first new well comprises generating at least a first of a plurality of development plans; and
determining the plurality of potential drilling locations for the second new well comprises generating others of the plurality of development plans;
wherein:
the first of the plurality of development plans is for a period before the later time; and
the others of the plurality of development plans are for a period after the later time.

14. The method of claim 13, further comprising:
using the plurality of development plans to generate a plurality of production forecasts corresponding thereto;
using the plurality of production forecasts to generate the plurality of performance metrics; and
using respective ones of the respective pluralities of performance metrics to generate respective statistical measures corresponding thereto.

15. The method of claim 14, wherein:
each of the plurality of development plans for the period after the later time corresponds to a respective one of the plurality of geological models of the reservoir;
each of the plurality of production forecasts corresponds to one of the plurality of development plans; and
each of the plurality of performance metrics corresponds to one of the plurality of production forecasts.

16. The method of claim 13, wherein the others of the plurality of development plans each correspond to the first of the plurality of development plans, the method further comprising:
determining a plurality of statistical measures representative of respective others of the plurality of development plans; and
based on the plurality of statistical measures representative of respective ones of the plurality of development plans, calculating the single statistical measure representative of the first of the plurality of development plans.

* * * * *